Patented Apr. 2, 1929.

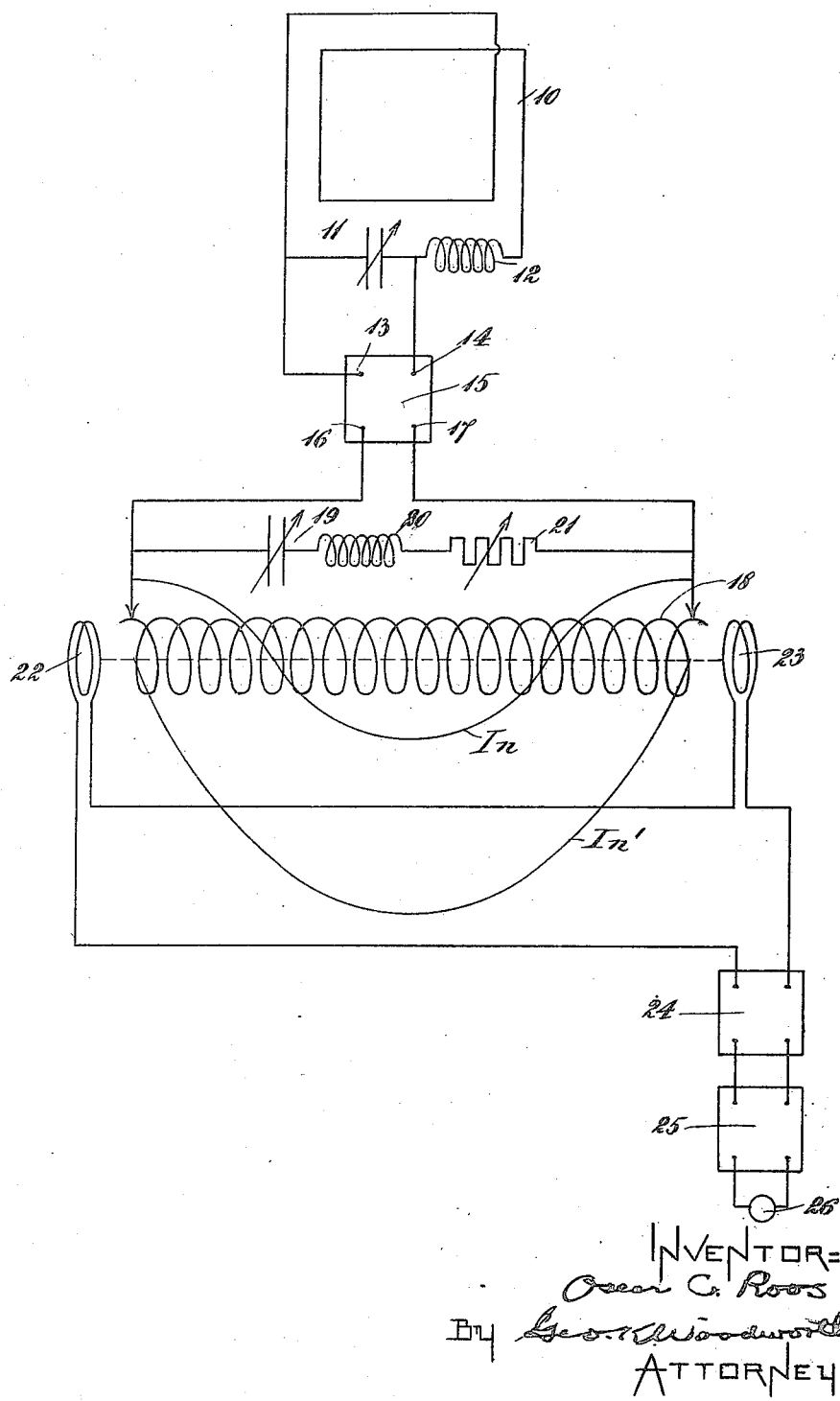

1,707,945

UNITED STATES PATENT OFFICE.

OSCAR C. ROOS, OF BRONX, NEW YORK.

ELECTROMAGNETIC-WAVE RECEIVING SYSTEM.

Original application filed October 6, 1921, Serial No. 505,785. Divided and this application filed November 27, 1925. Serial No. 71,620.

My invention relates to electromagnetic-wave receiving-systems and more especially to such systems whereby the effect on the oscillation detector of electrical vibrations created in the system by abrupt or impulsive electrical forces, such for example as "static disturbances", so called, is eliminated or reduced to a minimum so that the signal-interference ratio is a maximum.

With this object in view my invention comprises as its salient features an electrical apparatus for converting abrupt or impulsive electrical forces into periodic vibrations of predetermined frequency, spatialized or not as the case may be, and an electrical apparatus for spatializing said periodic vibrations so resulting from such abrupt or impulsive electrical forces and for spatializing the electrical vibrations created in the receiving system by the electromagnetic waves the energy of which is to be received.

The first-mentioned apparatus may conveniently be referred to as a "reverberator" and the second as a "spatializer". The reverberator may consist of any instrumentality such as a circuit, either closed or open, which is caused to vibrate periodically by abrupt or impulsive electrical forces. The spatializer may best consist of a slow-speed circuit, which, as is well understood, is a circuit having its electromagnetic constants continuously and uniformly distributed as in the case of an open or closed solenoid. The properties of such slow-speed circuits are well understood by those skilled in the art and need not be set forth at length herein, except to point out that such a circuit, in order to perform the function of a spatializer must be so designed as to permit the development therein of at least a quarter wave length of an electric wave.

In carrying out my invention I employ means for conductively connecting the spatializer with the reverberator, and other means for electrically associating the oscillation detector with the spatializer.

My invention contemplates, in general, a conducting member so electrically associating the oscillation detector with the reverberator that the ratio of the amplitude therein of the vibrations to be received to the amplitude therein of the vibrations resulting from the abrupt or impulsive electrical forces is as large as may be, and in special cases where the reverberator also performs the functions of a spatializer, said member may be a simple conductor. Preferably the reverberator is designed to have its most pronounced natural rate of vibration, or if it is a spatializer as well as reverberator, its fundamental natural period, different from that of the waves the energy of which is to be received, and the slow-speed circuit is designed to have its fundamental natural period or one of its harmonics equal to the most pronounced rate of vibration of the reverberator, and in the special cases aforesaid where the reverberator performs the functions of a spatializer the slow-speed circuit is designed to have its fundamental or one of its harmonics equal to the fundamental natural period or one of the harmonics of the reverberator,—in general, one of the natural rates of vibartion of said slow-speed circuit is made equal to one of the natural rates of vibration of said reverberator. As hereinafter more fully set forth, the reverberator, except in certain special cases, must have two degrees of freedom, or two natural rates of vibration, one of which is the frequency of the waves, the energy of which is to be received, and the other, which is its most pronounced natural rate of vibration, the frequency developed therein by abrupt or impulsive electrical forces. Where the reverberator performs the function also of a spatializer, it must in general have two degrees of freedom, as above set forth, and the spatializer must also have two degrees of freedom or two natural rates of vibration corresponding respectively to the two natural rates of the reverberator, one being the frequency of the waves the energy of which is to be received, and the other that of the vibrations developed therein by abrupt or impulsive electrical forces.

In my application Ser. No. 505,785, filed October 6, 1921 of which this application is a division, I have shown and claimed systems in which the reverberator performs the functions of a spatializer, and has two degrees of freedom.

In the system shown in the present application the reverberator does not perform the functions of a spatializer and has but a single degree of freedom.

By spatializing the electrical vibrations developed in the system by abrupt or impulsive electrical forces and those resulting from the waves the energy of which is to be received, I am enabled to associate the oscillation detector with the spatializer at a point or points where the amplitude of the vibrations to be received is substantially larger than that of the vibrations resulting from the abrupt or impulsive electrical forces and thereby eliminate or reduce to a minimum the effect of the latter on said detector.

It will be obvious that the principle underlying my invention may be embodied in a multiplicity of apparatus and circuit arrangements, and therefore it will be understood that the system hereinafter particularly described, is illustrative merely and not restrictive.

In the drawings accompanying and forming a part of this specification, the figure is a diagram of an electromagnetic wave receiving system embodying my invention.

In the drawings particularly selected for more fully disclosing the principle of my invention, the aerial or elevated conductor system consists of a loop antenna 10 which includes the serially-connected condenser 11 and inductance 12, the said aerial system being designed to have practically a single degree of freedom and being attuned to a predetermined frequency $n'$. The aerial system is connected to the input terminals 13, 14 of the radio-frequency amplifier 15, and the output terminals 16, 17 of the latter are conductively connected to the slow-speed circuit 18 which is designed to have its fundamental equal to said frequency $n'$ to which the aerial system is attuned, although it will be understood that said slow-speed circuit may be so constructed that one of its harmonics is equal to said frequency $n$. Connected across the terminals of the slow-speed circuit 18 is a series resonant circuit which includes the condenser 19, inductance 20 and resistance 21, and is attuned to the frequency $n'$ aforesaid.

Abrupt or impulsive electrical forces will cause the aerial or antenna system to vibrate at frequency $n'$ and therefore said system constitutes a means for converting abrupt or impulsive electrical forces into periodic vibrations of predetermined frequency. Such vibrations are amplified by the apparatus 15 and are conveyed to the slow-speed circuit where they are spatialized, the curve $In'$ representing the current stationary-wave formed in said slow-speed circuit by vibrations of frequency $n'$.

Inasmuch as the slow-speed circuit 18 vibrates at the half wave length for vibrations of frequency $n'$, it acts as a rejector circuit for vibrations of said frequency and thereby reduces the amplitude of said vibrations therein because it develops an enormously high impedance for vibrations of said frequency and all odd harmonics thereof, being in fact the equivalent of the usual rejector circuit consisting of two parallel-branches, one of which for the frequency to be rejected, has an equivalent capacity reactance, and the other a numerically-equal equivalent inductance reactance. The said rejector slow-speed circuit 18 will almost completely prevent the transmission of vibrations of frequency $n'$ developed therein by abrupt or impulsive electrical forces, but will offer very little impedance to the passage therethrough of periodic vibrations of frequency $n$ of the waves to be received.

The circuit 19, 20, 21 attuned to said frequency $n'$ serves as a resonant absorbing shunt for vibrations of said frequency and still further reduces the amplitude of said vibrations in the slow-speed circuit.

In the present instance the signal waves have the frequency $n$ which is equal to $2n'$ and therefore the response of the aerial system to waves of said frequency $n$ will be relatively feeble. The vibrations developed in the receiving system by said waves of frequency $n$ are amplified by the apparatus 15 and conveyed to the slow-speed circuit where they are spatialized, the curve $In$ representing the current stationary-wave formed in the slow speed circuit by said vibrations.

At points where the curve $In$ crosses the zero axis and the curve $In$ has maxima of the same sign, the oscillation detector is associated with the slow-speed circuit, the associating means represented in the present case being the secondaries 22, 23, which for convenience are shown as slightly removed from the ends of the slow-speed circuit, although it will be understood that they surround said circuit at the points above indicated. By virtue of such association, it will be readily apparent that the energy translated to the circuit of said secondaries of vibrations of frequency $n$ will be very much larger than that translated thereto by vibrations of the frequency $n'$, in spite of the fact that the aerial system is actually detuned to twice the latter.

If desired, a radio-frequency amplifier 24 and an audio-frequency amplifier 25 may be interposed between the signal-indicating device 26 and the secondaries 22, 23.

The system herein particularly described for the purpose of more fully disclosing my invention involves the application of my discovery that the vibrations created in a receiving system by abrupt or impulsive electrical forces may be spatialized in a suitable instrumentality, and that by spatializing in the same instrumentality the vibrations to be received, the two sets of vibrations may be segregated.

The best apparatus known to me at the present time for effecting such a spatialization and segregation of the two sets of vibrations is a slow-speed circuit, but it is to be understood that I do not limit my invention to the use of the same.

It will be obvious that the principle underlying my invention can be embodied in numerous forms of apparatus and circuit arrangements and therefore it is to be understood that my invention, as defined by the appended claims, is not to be limited to the particular form of apparatus and circuit arrangement herein specifically described.

I claim:—

1. An electromagnetic-wave receiving-system comprising in combination means for converting abrupt or impulsive electrical forces into persistent periodic vibrations of predetermined frequency, said means having a single degree of freedom and its most pronounced natural rate of vibration different from that of the waves the energy of which is to be received, an oscillation detector, a slow-speed circuit having its electromagnetic constants continuously and uniformly distributed and being constructed and arranged to permit the development therein of standing waves without appreciable attenuation, means electrically associating said slow-speed circuit with said means, and means electrically associating said detector with said slow-speed circuit.

2. An electromagnetic-wave receiving-system comprising in combination means for converting abrupt or impulsive electrical forces into persistent periodic vibrations of predetermined frequency, said means having a single degree of freedom and its most pronounced natural rate of vibration different from that of the waves the energy of which is to be received, an oscillation detector, a slow-speed circuit having its electromagnetic constants continuously and uniformly distributed and being constructed and arranged to permit the development therein of standing waves without appreciable attenuation, said slow-speed circuit having its fundamental natural period equal to the most pronounced rate of vibration of said means, means electrically associating said slow-speed circuit with said means and means electrically associating said detector with said slow-speed circuit.

3. An electromagnetic-wave receiving-system comprising in combination means for converting abrupt or impulsive electrical forces into persistent periodic vibrations of predetermined frequency, said means having a single degree of freedom, a slow-speed circuit having its electromagnetic constants continuously and uniformly distributed and being constructed and arranged to permit the development therein of standing waves without appreciable attenuation, means electrically associating said slow-speed circuit with said means, an oscillation detector, and means for electrically associating the same with said slow-speed circuit.

4. An electromagnetic-wave receiving-system comprising in combination means for converting abrupt or impulsive electrical forces into persistent periodic vibrations of predetermined frequency, said means having a single degree of freedom, a slow-speed circuit having its electromagnetic constants continuously and uniformly distributed and being constructed and arranged to permit the development therein of standing waves without appreciable attenuation, means electrically associating said slow-speed circuit with said means, a circuit resonant to the frequency of the vibrations resulting from said abrupt or impulsive electrical forces and connected across the terminals of said slow-speed circuit, an oscillation detector, and means for electrically associating the same with said slow-speed circuit.

In testimony whereof, I have hereunto subscribed my name this 17th day of November, 1925.

OSCAR C. ROOS.